United States Patent
Kotaru et al.

(10) Patent No.: US 11,924,781 B2
(45) Date of Patent: Mar. 5, 2024

(54) ADAPTIVE POWER CONTROL FOR INTERCELL INTERFERENCE MANAGEMENT

(71) Applicant: Microsoft Technology Licensing, LLC, Redmond, WA (US)

(72) Inventors: Manikanta Kotaru, Kenmore, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 17/350,919

(22) Filed: Jun. 17, 2021

(65) Prior Publication Data

US 2022/0408377 A1 Dec. 22, 2022

(51) Int. Cl.
*H04W 52/36* (2009.01)
*H04W 24/08* (2009.01)
(Continued)

(52) U.S. Cl.
CPC ......... *H04W 52/367* (2013.01); *H04W 24/08* (2013.01); *H04W 52/0245* (2013.01);
(Continued)

(58) Field of Classification Search
CPC ... H04W 72/54; H04W 72/542; H04W 24/08; H04W 24/10; H04W 52/0209;
(Continued)

(56) References Cited

U.S. PATENT DOCUMENTS 9,794,014 B2 * 10/2017 Seo .................. H04L 5/0073
9,948,437 B2 * 4/2018 Seo .................. H04L 5/0032
(Continued)

FOREIGN PATENT DOCUMENTS

EP 2930981 A1 10/2015

OTHER PUBLICATIONS

"International Search Report and Written Opinion Issued in PCT Patent Application No. PCT/US22/028883", dated Sep. 2, 2022, 11 Pages.
(Continued)

*Primary Examiner* — Jenee Holland
(74) *Attorney, Agent, or Firm* — Holzer Patel Drennan

(57) ABSTRACT

A method for controlling transmission power from one or more radio units is provided including monitoring channel state feedback for a signal communicated between a first radio unit of the one or more radio units and a user device in a transmitted frequency range, wherein the channel state feedback is based at least in part on a metric of quality of the communicated radiofrequency signal, determining that the channel state feedback satisfies a channel state condition, wherein the channel state condition includes a metric to evaluate performance of the one or more radio units relative to the user device based at least on the metric of quality of the communicated signal, and transmitting an instruction to adjust a transmission power in the transmitted frequency range of at least one of the one or more radio units based at least on the satisfaction of the channel state condition.

20 Claims, 5 Drawing Sheets

(51) Int. Cl.
*H04W 52/02* (2009.01)
*H04W 52/14* (2009.01)
*H04W 52/24* (2009.01)
*H04W 52/26* (2009.01)
*H04W 52/38* (2009.01)
*H04W 52/60* (2009.01)
*H04W 72/542* (2023.01)

(52) U.S. Cl.
CPC ....... *H04W 52/241* (2013.01); *H04W 52/243* (2013.01); *H04W 72/542* (2023.01)

(58) Field of Classification Search
CPC ......... H04W 52/0225; H04W 52/0245; H04W 52/24; H04W 52/241; H04W 52/243; H04W 52/245; H04W 52/367
See application file for complete search history.

(56) References Cited

U.S. PATENT DOCUMENTS

| | | | | |
|---|---|---|---|---|
| 10,492,092 | B2* | 11/2019 | Kim | H04L 5/005 |
| 10,834,622 | B2* | 11/2020 | Seo | H04W 72/20 |
| 2014/0099881 | A1* | 4/2014 | Boudreau | H04W 16/28 |
| | | | | 455/7 |
| 2015/0094114 | A1 | 4/2015 | Rao et al. | |
| 2016/0036504 | A1* | 2/2016 | Khojastepour | H04B 7/024 |
| | | | | 370/280 |
| 2016/0374067 | A1* | 12/2016 | Uchiyama | H04W 72/51 |
| 2017/0086199 | A1* | 3/2017 | Zhang | H04W 48/20 |
| 2017/0215158 | A1* | 7/2017 | Zhu | H04L 5/0048 |
| 2017/0353976 | A1* | 12/2017 | Yerramalli | H04W 74/004 |
| 2019/0254037 | A1* | 8/2019 | Gupta | H04L 5/0082 |
| 2019/0297630 | A1* | 9/2019 | Chen | H04L 1/1893 |
| 2020/0052754 | A1* | 2/2020 | Jung | H04L 1/0003 |
| 2020/0275297 | A1* | 8/2020 | Jung | H04W 24/10 |
| 2020/0336181 | A1* | 10/2020 | Cao | H04B 17/336 |
| 2020/0358503 | A1* | 11/2020 | Hao | H04W 80/08 |
| 2021/0058961 | A1* | 2/2021 | Patel | H04L 1/1671 |
| 2021/0176670 | A1* | 6/2021 | Keskitalo | H04W 76/10 |

OTHER PUBLICATIONS

Bahl, et al., "Cell Breathing in Wireless LANs: Algorithms and Evaluation", In Journal of IEEE Transactions on Mobile Computing, vol. 6, Issue 2, Feb. 2007, 22 pages.

* cited by examiner

ADAPTIVE POWER CONTROL FOR INTERCELL INTERFERENCE MANAGEMENT

BACKGROUND

User equipment (e.g., user mobile devices) connects with radio units (e.g., cell towers) to communicate with a network. Data is exchanged between the user equipment and at least one radio unit. The user equipment may be communicatively coupled to more than one radio unit. Distributed units and/or centralized units can be used to coordinate radiofrequency emission power and/or range from the radio units.

SUMMARY

The described technology provides implementations of systems and methods for controlling transmission power. More specifically, the described technology provides implementations of systems and methods for centralized control of radio unit transmission power.

A method for controlling transmission power from one or more radio units is provided. The method includes dynamically monitoring channel state feedback for a radiofrequency signal communicated between a first radio unit of the one or more radio units and at least one user device in a transmitted frequency range, wherein the channel state feedback is based at least in part on a metric of quality of the communicated radiofrequency signal, determining that the channel state feedback satisfies a channel state condition, wherein the channel state condition includes a metric to evaluate performance of the one or more radio units relative to the at least one user device based at least in part on the metric of quality of the communicated radiofrequency signal, and transmitting an instruction to adjust a transmission power in the transmitted frequency range of at least one of the one or more radio units based at least in part on the satisfaction of the channel state condition.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
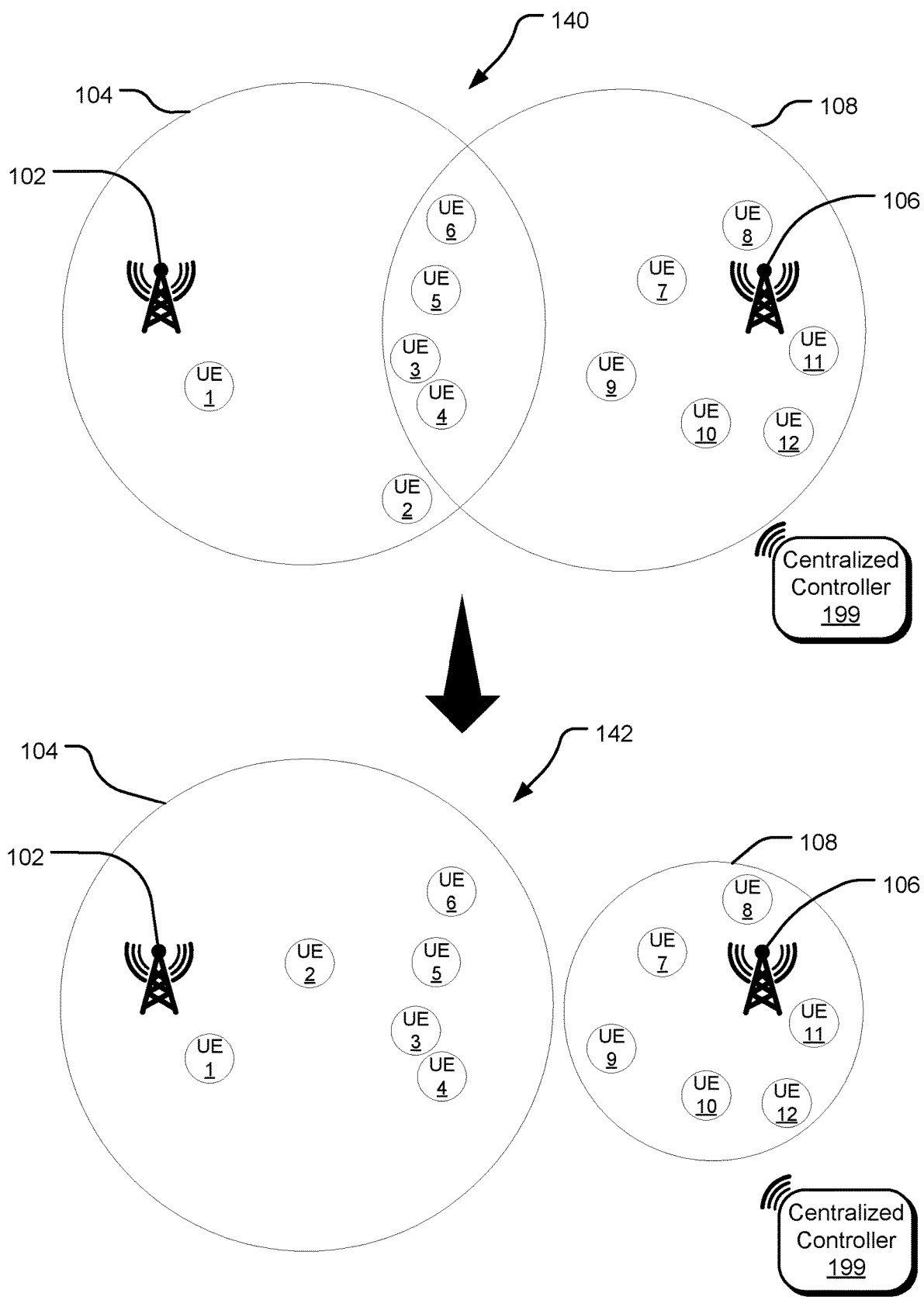
FIG. 1 illustrates an example system for controlling transmission power from at least one radio unit.

As processing power increases in computing devices, the need for and advantage of using specialized hardware in systems is waning. Instead, standard computing devices executing specialized software can be used to control systems that were previously controlled by specialized hardware. Modern data network or cellular network technology allows for more centralized control of processes of radio units (RUs) from remote locations. For example, RUs can be manipulated in concert to coordinate transmission power and emission ranges for radiofrequency transmissions from adjacent or otherwise close RUs.

In a network of RUs (e.g., a mobile carrier's communication network), signal transmission by one RU can create interference with another proximate RU. Accordingly, the geographic placement of RUs is typically planned to minimize such interference. However, environmental and network conditions are dynamic, making such static approaches inadequate for reducing interference under dynamic conditions.

As such, dynamically manipulating the transmission power of a RU in a frequency range can reduce the likelihood of signal interference from RUs having overlapping coverage areas for particular frequency bands. RUs operating in the same frequency range and over the same areas can cause interference and reduce data coherence in user equipment units (UEs) located within the overlapping coverage areas. For the purpose of this specification, the terms UEs and user devices may be used interchangeably and refer to implementations of one another.

Because systems may be less dependent upon localized and specialized hardware at the RUs, a more centralized control can be established to coordinate transmission power within frequency ranges between RUs. This higher-level coordination can be used to decrease interference experienced by UEs that at least initially receive signals from more than on RU and can also help with load balancing to each RU. Both of these results may improve the functionality of the UE and the experience of associated users. The coordination can also facilitate the communicative coupling of UEs while providing sufficient signal strength when communicating with a RU to maintain connections to the communication network.

Radiofrequency interference may come from several sources, for example, environmental sources, local congestion in a frequency range for the RUs and UEs, and overlapping coverage areas in a frequency range. In order to determine an appropriate power adjustment for one or more RUs to minimize interference, channel state feedback may be generated for each RU and all of the UEs communicating with each RU. Channel state feedback may include data from UEs and RUs that indicate interference, for example, one or more of distance between UEs and RUs, the number of RUs to which a particular UE is communicatively coupled in a particular frequency range, geographic considerations, the number of UEs communicatively coupled to a RU in the frequency range, error rates in data transfer between UEs and RUs (e.g., bits or packets dropped), current levels of transmission power from the RUs, a measured signal strength, measured data throughput, and expected data throughput (for comparison). In implementations, error rates can be determined through reception of data from UEs without dedicated channel state feedback inquiries or can be determined by actively transmitting dedicated channel state feedback inquiries from the RUs to the UEs and receiving the replies.

The channel state feedback may be expressed in an interference graph. An interference graph may express one or more of a magnitude of interference and a strength of communications in a transmission frequency range experienced in data exchanges between UEs and communicatively coupled RUs.

The most static control of coverage area for an RU is the location of the RU, itself. This may be impractical to modify dynamically without significant planning and expense. The centralized control can rely on varying levels of dynamic control after the RUs have already been placed. In an implementation, the distance of centralized controllers of transmission power from the controlled RUs may depend on different levels of dynamicity needed. For example, for largely static systems, latency is not a significant issue, and control can be established at centralized systems more distant from the RUs. Some sources of interference may be environmental (e.g., large concrete or steel structures that interfere with signals) such that they do not significantly change with time, so control for these changes may be a bit further from the RUs. Systems or locations in which users are expected to transfer between RUs frequently (e.g., on a highway) may have less latency tolerance for dynamic transmission power and transitioning connectivity between RUs, and UEs and may benefit from RU transmission control being situated closer to the RUs for these scenarios.

FIG. 1 illustrates an example system for controlling transmission power from at least one RU. The system 100 includes scenarios 140 and 142. Specifically, in scenario 140, there is a first RU 102 having a first coverage area 104 in a frequency range and a second RU 106 having a second coverage area 108 in the same or overlapping frequency range. Although illustrated as circles for simplicity, because of environmental and electromagnetic effects, the coverage areas 104, 108 will not likely be circular in reality. The system 100 has user equipment units (UEs) 1-12. UEs are user communication devices relying on the UEs 1 and 2 are in the first coverage area 104 but not the second coverage area 108, so user UEs 1 and 2 are only communicatively coupled to the first RU 102. UEs 3-6 are located where the first coverage area 104 and the second coverage 108 overlap, so UEs 3-6 are communicatively coupled to both the first RU 102 and the second RU 106. UEs 7-12 are in the second coverage area 108 but not the first coverage area 104, so UEs 7-12 are communicatively coupled only with the second RU 106.

Scenario 140 may present sources of interference that can affect signal quality. The quality of a signal may be harmed by interference. For example, UEs 3-6 in the overlapping coverage area may receive signals from both the first RU 102 and the second RU 106 in the same frequency range. Because these signals may not be identical or may not be perfectly aligned in time or sampling, the transmission in the same or similar frequency ranges may cause destructive interference in the relevant signals. Implementations are contemplated in which those signals can be reconciled to provide more constructive interference, but they are not treated in this specification. Also illustrated is that the first RU 102 supplies communication services to UEs 1-6, and the second RU 106 supplies communication services to UEs 3-12. This means that the first RU 104 supplies communications services to fewer UEs than the second RU 106 in the same frequency range. The UEs 3-12 may experience more congestion in communications with the second RU 106 than UEs 1 and 2 experience with the first RU 102.

The quality of a network signal can also be affected by signal strength. Signal strength can be weaker as a UE 1-12 moves further from the RUs 102, 106. Signal strength can also be affected by sources of interference. While signal strength is often a good metric for determining the quality of a signal, scenario 140 illustrates that, because UE 3 is located closer to the first RU 102 than UE 2, UE 3 may show a stronger signal with the first RU 102 than UE 2, but UE 3 may be experiencing more interference due to the overlapping coverage areas than UE 2.

A centralized controller 199 can transmit instructions to adjust transmission power supplied to the first RU 102 and second RU 106 to better accommodate the UEs 1-12, for example, by one or more of balancing the load and reducing the overlapping coverage area between the first RU 102 and the second RU 106. An arrow is illustrated to show a transition from scenario 140 to scenario 142. Specifically, as illustrated in scenario 142, the first coverage area 104 has increased, and the second coverage area 108 has decreased. To increase the first coverage area 104, the first RU 102 may receive an instruction from the centralized controller 199 to increase transmission power in the relevant frequency range. To decrease the second coverage area 108, the second RU 106 may receive an instruction from the centralized controller 199 to decrease transmission power in the relevant frequency range. As illustrated, the results of the centralized control of transmission power, despite the disparity in coverage areas 104, 108, are that UEs 1-6 are exclusively in communication with the first RU 102, and UEs 7-12 are exclusively in communication with the second RU 106.

Effects of the transition from scenario 140 to scenario 142 may include that the same number of UEs 1-6, 7-12 are serviced by the first RU 102 and the second RU 106 (i.e., better load balancing), respectively, and that there is no overlapping coverage area in which UEs 1-12 communicate with both RUs 102 and 106. Scenario 142 may present less interference for UEs 3-12 than in scenario 140 in which UEs 3-6 were in an overlapping coverage area and in which the second RU 106 services 10 UEs to the first RU's six UEs. Further, in scenario 142, because the UEs 3-6 may be closer to the first RU 102 than the second RU 106, scenario 142 makes it more likely that UEs 3-6 will be better serviced by the first RU 102 than the second RU 106. By controlling the transmission power of RUS 102, 106 in a centralized manner, better connectivity may be provided to at least UEs 3-12 in the relevant frequency range.

In at least one implementation, to determine the signal quality (e.g., interference and/or signal strength) experienced by UEs 1-12, channel state feedback may be monitored and/or generated at a centralized or distributed controller for each connection between a UE 1-12 and an RU 1-2, 106. Channel state feedback can include data from UEs 1-12 and the RUs 102, 106 and can be based at least in part on (e.g., indicate, summarize, evaluate, and/or represent) metrics of signal quality for signals transmitted between UEs 1-12 and RUs 102, 106. For example, the channel state feedback data may include data representing or an inferential metric based on one or more of the distance between UEs 1-12 and RUs 102, 106; the number of RUs 102, 106 to which particular UEs 1-12 are communicatively coupled in a particular frequency range; geographic considerations; the number of UEs 1-12 communicatively coupled to a RU 102, 106 in the frequency range; the balance of loads (e.g., number of communicatively coupled UEs 1-12) between RUs 102, 106; error rates in data transfer between UEs 1-12 and RUs 102, 106 (e.g., bits or packets dropped); current levels of transmission power from the RUs 102, 106; measured signal strength; measured data throughput; and expected data throughput (e.g., for comparison). Also, if a UE 1-12 receives strong signals from more than one RU 102, 106 in a particular frequency range, it is an indication that there is interference. In implementations, error rates can be determined through reception of data from UEs 1-12 without dedicated channel state feedback inquiries or can be determined by actively transmitting dedicated channel state feedback inquiries from the RUs 102, 106 to the user equipment and receiving the replies. Base stations may transmit reference signals and measure the channel state feedback. For example, in multiple-input-multiple-output (MIMO) systems, the base station may transmit a reference signal to UEs 1-12. From this reference signal, the UEs 1-12 may calibrate channel state feedback, perhaps with information including how the environment modifies the signal transmitter in each of the transmission frequencies. The reference signal may come in the form of system information blocks and master information blocks. This information may include beacon information including, for example, bandwidth, UE identifier, and network identifier. The base stations may rely on beacon information to identify one or more of UEs 1-12.

The channel state feedback can be expressed in an interference graph. An interference graph can express one or more of a magnitude of interference and a strength of communications in a transmission frequency range experienced in data exchanges between UEs 1-12 and communicatively coupled RUs 102, 106. The interference graph may provide a more global view of RUs 102, 106 that transmit in the same or similar frequency range and are sufficiently proximal to one another to cause interference in communications with UEs 1-12.

A centralized controller 199 can determine whether the channel state feedback satisfies a channel state condition. The channel state condition may reflect one or more of a signal strength, a signal interference, and a coverage (e.g., assuring that all UEs have coverage in a particular radiofrequency range). The channel state condition can include a metric to evaluate performance of the RUs 102, 106 relative to the UEs 1-12 based at least in part on a metric of quality of the communicated radiofrequency signal (e.g., a metric of quality reflected in channel state feedback). For example, the channel state condition may include that at least one UE 1-12 is experiences interference The satisfaction of a channel state condition may be determined using channel state feedback from multiple UEs 1-12 and multiple RUs 102, 106, perhaps aggregated in an interference graph. For example, channel state feedback can include feedback from connections between UEs 1-12 and RUs 102, 106 to determine whether a condition is satisfied. The condition may be based at least in part on an overall impression of coverage and connectivity in coverage areas 104, 108 to determine whether transmission power adjustments to one or more of RUs 102 and 106 may provide better service to one or more of the UEs 1-12. The channel state condition may also include measures to prevent changing transmission power to RUs 102, 106 which may cause one or more UEs 1-12 to have limited or no coverage from the RUs 102, 106.

The channel state condition can be static or dynamic. Dynamic channel state conditions can be applied to changing circumstances. Changing circumstances can include one or more of weather events (e.g., storms or storm-related outages), periods of high utilization, changes in utilization in various locations at different times, or system failures. Examples of changes in the channel state condition include one or more of changes in magnitudes of thresholds (e.g., signal interference, number of UEs 1-12 serviced by an RU 102, 106, or error rates) and natures of conditions (e.g., ones based on seasonal variations, business contexts, or RU 102, 106 equipment types).

The centralized controller 199 may use inferential methods to determine the overall impression of channel state feedback generated between one or more RUs 102, 106 and UEs 1-12, and whether the channel state feedback satisfies the channel state condition. The inferential methods may include, for example, one or more of machine learning, artificial intelligence, state machines, propagation modeling, and regression modeling. In implementations, the centralized controller 199 may be positioned in a distributed unit, a centralized unit, or a cloud unit, or may be distributed among them. Machine learning algorithms applied may include one or more of supervised learning, long-short-term memory, recurrent neural networks, reinforcement learning, and combinatorial optimization. The data input may include one or more of current transmission power of the RUs 102, 106; channel state feedback generated; reference signals transmitted; environmental factors; numbers of UEs 1-12; locations of RUs 102, 106; UE 1-12 triangulation data; transmission frequency data for one or more of the UEs 1-12 and RUs 102, 106; beacon information; and data representing to which RUs 102, 106 EUs 1-12 are communicatively coupled and/or communicatively couplable, perhaps with specificity in the frequency ranges in which the UEs 1-12 operate.

The centralized controller 199 may include a radio access network (RAN) controller, for example, a radio access network intelligent controller (RIC). In modern RIC systems, the RIC may include one or more of a non-real-time RIC (supporting tasks allowing for greater than one second of latency) and near-real-time RICs (supporting tasks requiring latency of one second or less). Overall RAN (O-RAN) architecture may include one or more software elements, for example, a distributed unit (DU) software function, a multi-radio access transmission (multi-RAT) central unit (CU) protocol stack, a near-real-time RIC, and the orchestration layer with non-real time RIC.

The most static control of coverage area for an RU 102, 106 is the location of the RU 102, 106, itself. This may not be readily modifiable without significant planning. The centralized control can rely on varying levels of dynamic control after the RUs 102, 106 have already been placed. In an implementation, the distance of centralized controllers 199 of transmission power from the controlled RUs 102, 106 may depend on different levels of dynamicity needed. For example, for largely static systems, latency is not a significant issue, and control can be established at centralized systems more distant from the RUs 102, 106. Some sources of interference may be environmental (e.g., large concrete or steel structures that interfere with signals) such that they do not significantly change with time, so control for these changes may be a bit further from the RUs 102, 106. Systems or locations in which users are expected to transfer between RUs 102, 106 frequently (e.g., on a highway) may have less latency tolerance for dynamic transmission power and transitioning connectivity between RUs 102, 106 and UEs 1-12 and may require control closer to the RUs 102, 106 for these scenarios. The frequency or number of instructions transmitted over time for adjusting power at RUs 102, 106 (not to be confused with the radiofrequency at which the instructions are transmitted) may differ depending on the dynamicity required.

In systems in which control of transmission power supplied to RUs 102, 106 is decentralized, perhaps due to the use of local, specialized hardware, the RUs 102, 106 may only have the ability to control based at least in part on the issues experienced locally at each RU 102, 106. When the control is centralized, even if the communications between UEs 1-2 and even UEs 3-6 are satisfactory with the first RU 102, the centralized controller 199 may transmit instructions to adjust transmission power supplied to the first RU 102 solely because it would improve performance of connections with the second RU 106. In systems where the control is localized at the RUs 102, 106 or other transmitters, there may be insufficient centralized control to allow for changes in transmission power supplied to RU 102 that are based at least in part on the communications of a different, second RU 106 that is near or adjacent to the first RU 102. This may provide an advantage over locally controlled RU systems in which local transmission power adjustment at the first RU 102 does not account for communications with the second RU 106.

Operations for control at different levels of dynamicity are contemplated. For example, the instructions to adjust power dynamically may be in response to data throughput determinations between RUs 102, 106 and UEs 1-12. An interference graph may be used for this determination. Periodic adjustments to transmission power may be made based at least in part on changes to the environment that may be less frequent. Implementations are contemplated where the transmission power adjustments may be real-time or near-real-time and/or consistent.

Figure 2:
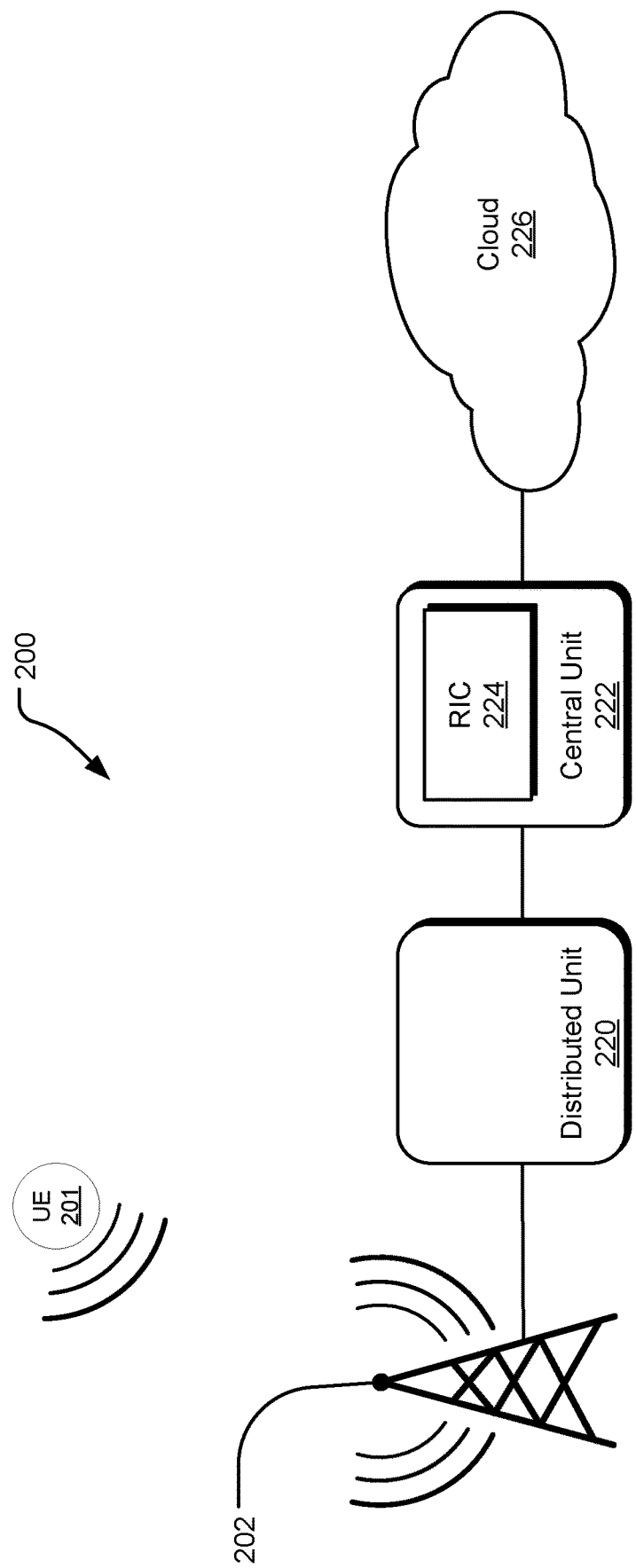
FIG. 2 illustrates another example system for controlling transmission power from at least one RU.

FIG. 2 illustrates another example system 200 for controlling transmission power from at least one RU 202. To reduce latency in fifth-generation (5G) network systems, the radio access network (RAN) has been further virtualized for combination with software-defined networking (SDN) to optimize management of and standardize RAN control. For example, the RAN virtualization reduces costs to operators, allows for easier modification, and introduces greater programmability of networks. The open RAN (O-RAN) standards have been adopted to facilitate uniform virtualizing and allow for greater compatibility between different network protocols and hardware. The standardization and virtualization enabled configuration, optimization, and control of the RAN infrastructure at edges before any aggregation points and culminated in the concept of the RAN Intelligent Controller. The RAN intelligent controller (MC) allowed 4G LTE logical radio node (eNBs) and 5G logical radio node (gNB) functionalities as X-series measurement applications (xApps) on northbound interfaces (i.e., an interface that allows a component to communicate with a higher-level component, perhaps only outbound to the higher-level communication component). Applications like mobility management, admission control, and interference management are available as apps on the controller which enforce network policies via a southbound interface toward radios in the network. RIC provides advanced control functionality, which delivers increased efficiency and better radio management. These control functionalities leverage analytics and data-driven approaches including machine learning and/ or artificial intelligence inference tools to improve resource management capabilities. Further, the separation between northbound and southbound interfaces also enables more efficient and cost-effective radio resource management for real-time and non-real-time functionalities, as the RIC customizes network optimization for each environment and use case. Virtualization creates software application infrastructure and a cloud-native environment for RIC, and SDN enables those applications to orchestrate and manage networks to deliver network automation for ease of deployment. RIC has been further developed to support older generation Open RAN standards, such as those for 2G, 3G, and 4G.

In an implementation, a centralized controller is distributed over a number of network elements and may include a RAN controller, for example, a RIC 224. In modern RIC 224 systems, the RIC 224 may include one or more of a non-real-time (Non-RT) RIC (supporting tasks requiring greater than one second of latency) and near-real-time (Near-RT) RICs 224 (supporting tasks requiring latency of a second or less). Near-RT RICs are microservice-based software platforms for hosting microservice-based xApps. The Near-RT RIC software platform provides xApps cloud-based infrastructure for controlling a distributed collection of RAN infrastructure (eNB, gNB, CU 222, DU 220) in an area via the O-RAN Alliance's E2 protocol ("southbound"). As part of this software infrastructure, it also provides "northbound" interfaces for operators: the A1 and O1 interfaces to the Non-RT RIC for the management and optimization of the RAN. The self-optimization is responsible for necessary optimization-related tasks across different RANs, utilizing available RAN data from all RAN types (macros, Massive MIMO, small cells). This improves user experience and increases network resource utilization, a key for facilitating a consistent experience on data-intensive 5G networks.

The Near-RT RIC hosts one or more xApps that use the E2 interface to collect near real-time information (on a UE basis or a cell basis). The Near-RT RIC control over the E2 nodes is steered via the policies and the data provided by A1 from the Non-RT RIC. The RRM functional allocation between the Near-RT RIC and the E2 node is subject to the capability of the E2 node and is controlled by the Near-RT RIC. For a function exposed in the E2 Service Model, the Near-RT RIC may monitor, suspend/stop, override or control the node via Non-RT RIC enabled policies. In the event of a Near-RT RIC failure, the E2 Node will be able to provide services, but there may be an outage for certain value-added services that may only be provided using the Near-RT RIC.

Non-RT RIC functionality includes configuration management, device management, fault management, performance management, and lifecycle management for all network elements in the network. It is similar to Element Management (EMS) and Analytics and Reporting functionalities in legacy networks. All new radio units are self-configured by the Non-RT RIC, reducing the need for manual intervention, which will be key for 5G deployments of Massive MIMO and small cells for densification. By providing timely insights into network operations, MNOs use Non-RT RIC to better understand and, as a result, better optimize the network by applying pre-determined service and policy parameters. Its functionality is internal to the SMO in the O-RAN architecture that provides the A1 interface to the Near-RT RIC. The primary goal of Non-RT RIC is to support intelligent RAN optimization by providing policy-based guidance, model management, and enrichment information to the Near-RT RIC function so that the RAN can be optimized. Non-RT RIC can use data analytics and AI/ML training/inference to determine the RAN optimization actions for which it can leverage SMO services such as data collection and provisioning services of the O-RAN nodes.

Trained models and real-time control functions produced in the Non-RT RIC are distributed to the Near-RT RIC for runtime execution. Network slicing, security and role-based Access Control and RAN sharing are key aspects that are enabled by the combined controller functions, real-time and non-real-time, across the network.

Multi-RAT CU 222 protocol stack function supports protocol processing and is deployed as a VNF or a CNF. It is implemented based on the control commands from the near-RT MC module. The current architecture uses F1/E1/

X2/Xn interfaces provided by 3GPP. These interfaces can be enhanced to support multi-vendor RANs, RUs, DUs, and CUs.

The Near-RT RIC can leverage intelligence and is responsible for per-UE controlled load-balancing, RB management, and interference detection and mitigation. This provides QoS management, connectivity management, and seamless handover control. Deployed as a VNF, a set of VMs, or CNF, it becomes a scalable platform to onboard third-party control applications. It leverages a Radio-Network Information Base (R-NIB) database which captures the near real-time state of the underlying network and feeds RAN data to train the AI/ML models, which are then fed to the Near-RT RIC to facilitate radio resource management for a subscriber. Near-RT RIC interacts with Non-RT RIC via the A1 interface to receive the trained models and execute them to improve the network conditions. The Near-RT RIC can be deployed in a centralized or distributed model, depending on network topology.

Near-RT RIC provides a software platform for xAPPS for RAN management and optimization. A large amount of network and subscriber data and Big Data, counters, RAN and network statistics, and failure information are available with L1/L2/L3 protocol stacks, which are collected and used for data features and models in Non-RT RIC. Non-RT RIC acts as a configuration layer to DU and CU software as well as via the E2 standard interface. They can be learned with AI and/or abstracted to enable intelligent management and control the RAN with Near-RT RIC. Some of the example models include, but are not limited to, spectrum utilization patterns, network traffic patterns, user mobility and handover patterns, service type patterns along with the expected quality of service (QoS) prediction patterns, and RAN parameters configuration to be reused, abstracted or learned in Near-RT RIC from the data collected by Near-RT RIC. This abstracted or learned information is then combined with additional network-wide context and policies in Near-RT RIC to enable efficient network operations via Near-RT RIC.

The O-RAN reference architecture enables not only next-generation RAN infrastructures, but also the best-of-breed RAN infrastructures. The architecture is based on well-defined, standardized interfaces that are compatible with 3GPP to enable an open, interoperable RAN. RIC functionality delivers intelligence into the Open RAN network with Near-RT RIC functionality providing real-time optimization for mobility and handover management, and non-RT RIC providing not only visibility into the network but also AI-based feeds and recommendations to near-RT RIC, working together to deliver optimal network performance for optimal subscriber experience. As a result of having 2G 3G 4G and 5G related xApps, 5G-like features can be delivered today to 2G, 3G, and 4G networks utilizing this RIC including ultra-low latency and high reliability for coverage or capacity use cases; ultra-high-throughput for consumer applications such as real-time gaming; and scaling from millions to billions of transactions, with voice and data handling that seamlessly scales up from gigabytes to petabytes in real-time, with consistent end-user experience for all types of traffic. The solution is a pre-standard near real-time RAN Intelligent Controller (RIC) and will adapt O-RAN open interfaces with the required enhancements and can be upgraded to them via a software upgrade. This will enable real-time radio resource management capabilities to be delivered as applications on the platform.

In an implementation, RAN architecture may include one or more software elements, for example, a distributed unit (DU) 220 software function, a multi-radio access transmission (multi-RAT) central unit (CU) 222 protocol stack, and a RIC 224. The RIC may have a Near-RT MC 224 and a Non-RT MC 224. Although the MC 224 is illustrated as a component of the CU 222 for simplicity, the RIC 224 may be distributed between one or more of the DU 220, CU 222, and a cloud network 226. It may be advantageous to implement faster, near-RT MC elements closer to the RUs 202 to reduce latency, with the expectation that the order of proximity to the RUs 202 decreasing (i.e. latency of processes increasing) from DU 220 to CU 222 to the cloud 226. One or more of the DU 220, CU 222, MC 224, and cloud server 226 may collectively or separately be implementations of the centralized controller 199.

In various implementations, the roles of each element of system 200 may differ as the distribution of tasks can be arbitrarily applied except to the extent that the RU 202 itself is typically responsible for the radio transmission.

In an implementation, a DU 220 is responsible for real-time layer 1 (L1, physical layer) and lower layer 2 (L2) which contains the data link layer and scheduling functions. In an implementation, the CU 222 is responsible for non-real-time, higher L2 and L3 (network) layer functions. While CUs 222 may maintain elements of baseband units typical of older generation communication protocols (e.g., digital processing), DUs 220 may be software-based and may open some functions related to a remote radio head (RRH) contained in the RUs 202. An Open RAN concept, such as ones in 5G systems, may allow DU 220 and CU 222 software to run on RUs 202 for any vendor.

In an implementation, the RU 202 is a radio hardware unit that converts radio signals sent to and from the antenna of the RU 202 into a digital signal for transmission over packet networks and to communicate with a UE 201. The RU 202 may handle the digital front end and the lower physical layer, as well as the digital beamforming functionality. 5G RUs 202 may be inherently intelligent, but key considerations for RU 202 design may include size, weight, and power consumption. The RUs 202 may be deployed on-site.

In an implementation, the DU 220 may be deployed on-site, close to the RU 202 and may run one or more of elements of the physical layer, the radio link control sublayer, and the medium access control sublayer and/or may be responsible for some eNB and/or gNB functionalities (e.g., transfer of user data, mobility control, RAN sharing, positioning, and session management). The DUs 220 may also be responsible for modulating data to increase local RU 202 performance. The distribution of responsibilities between the DU 220 and CU 222 can allow for any allocation of eNB and gNB functions between them. By separating the DU 220 and the RUs 202, the RUs 202 can be made less complicated and/or expensive, the DU 220 and/or CU 222 can control and consider multiple RUs 202 simultaneously, and the DU 220 and/or CU 222 processing can be pooled to realize performance gains. It may also allow load balancing between the RUs 202. Edge-centric baseband processing may deliver lower latency, local breakout, seamless mobility with real-time interference management, and optimal resource optimization.

In an implementation, the CU 222 may run software that runs the radio resource control and packet data convergence protocol layers. The CU 222 may be responsible for eNB and/or eNG functions not assigned to the DU 220. The CU 222 may control the operations of several DUs 220 over a mid-haul interface. Also, in implementations, CU 222 and DU 220 software can be collocated on the same server site. Because CU 222 and DU 220 functions may be fully virtualized, CU 222 and DU 220 functions may run as virtual software functions on standard computing systems and may be deployed in standard RAN tiered data centers. Implementations are also contemplated where the DUs 220 and CUs 222 are both elements of a remote cloud server 226, though placing some of these elements in a remote cloud server 226 may increase latency, perhaps in a manner that is impractical for real-time or near-real-time communications.

In 5G networks, Radio Resource Management (RRM) is responsible for transmission power control at the RUs 202. RRM is hosted in one or more of the Distributed DU 220 and the CU 222 and communicates the transmit power information to RUs 202 over fronthaul. RIC 224 may be responsible for generating and analyzing interference graphs and may communicate the transmit power control decisions to RRM through an E1 interface, in accordance with the O-RAN specification. RIC 224 communicates with RRM using the E1 interface. The intelligence to generate and analyze interference graphs can be embedded in the RIC 224 itself or in an interference management app that is placed outside RIC 224 (e.g., in the cloud) and communicates with RIC 224 as an xApp. Channel state feedback like channel state information and signal strength is obtained from uplink transmissions using demodulated reference signal (DM-RS) reference symbols and pilot symbols. Channel state information can also be obtained by transmitting sounding reference signals and explicitly requesting a UE 201 to send the channel state information obtained at UE 201 from the sounding reference signals. Signal strength measurements may be available at the UE 201 by monitoring the control channel from different RUs 202. For example, signal strength measurements may be obtained periodically from periodic cellular beacon signals like MIB and SIB.

Figure 3:
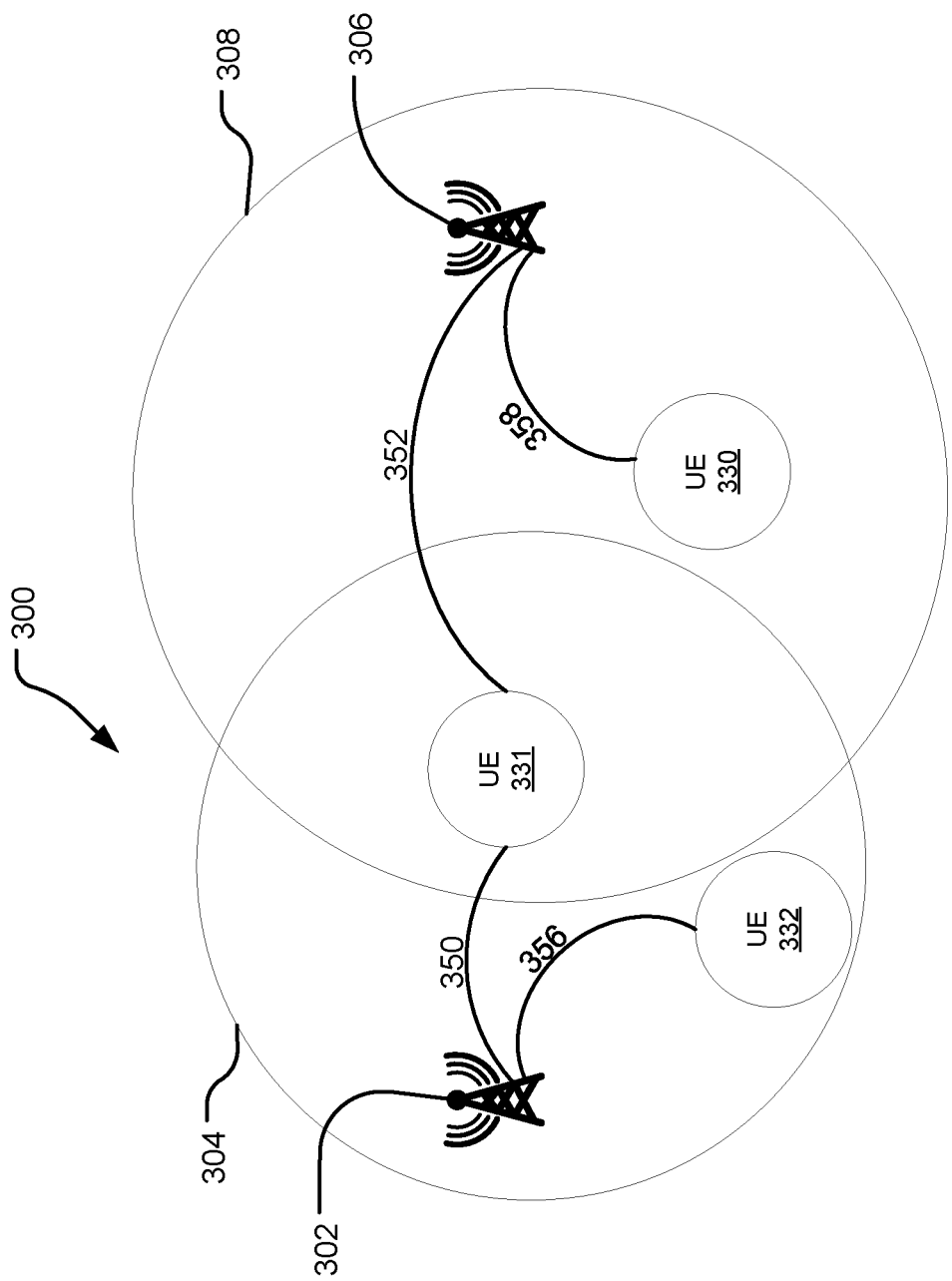
FIG. 3 illustrates an example interference graph.

FIG. 3 illustrates an example interference graph 300. The interference graph 300 incudes a first RU 302 having a first coverage area 304 in a frequency range and a second RU 306 having a second coverage area 308 in a similar or overlapping frequency range. UE 332 is in the first coverage area 304 and is communicatively coupled to the first RU 302. The UE 302 may provide channel state feedback 356 to RU 302 to be transmitted to the centralized control system for the network or the local nodes thereof. UE 331 is in an area of overlapping coverage between coverage areas 304, 308. The UE 331 communicates with the first RU 302 and provides channel state feedback 350 with respect to the first RU 302, and the UE 331 further communicates with the second RU 306 and also provides channel state feedback 352 with respect to the second RU 306. UE 330 is in the second coverage area 308 and is in communication with the second RU 306. UE 330 provides channel state feedback 358.

The channel state feedback 350, 352, 354, and 356 may be provided to one or more of a RIC, DU, CU, and cloud server and may be used to control transmission power of RUs 302, 306. Channel state feedback may include data from UEs 330, 331, 332 and the RUs 302, 306 that indicate interference, for example, one or more of a distance between UEs 330, 331, 332 and RUs 306, 306; the number of RUs 302, 306 to which a particular UE 330, 331, 332 is communicatively coupled in a particular frequency range; geographic considerations; the number of UEs 330, 331, 332 communicatively coupled to a RU 302, 306 in the frequency range; error rates in data transfer between UEs 330, 331, 332 and RUs 302, 306 (e.g., bits or packets dropped); current levels of transmission power from the RUs 302, 306; a measured signal strength; measured data throughput; and expected data throughput (for comparison). In implementations, error rates can be determined through the reception of data from UEs 330, 331, 332 without dedicated channel state feedback inquiries or can be determined by actively transmitting dedicated channel state feedback inquiries from the RUs 302, 306 to the UEs 330, 331, 332 and receiving the replies.

The interference graph 300 may include any channel state feedback and/or may have one or more of a signal strength; an interference measurement; UE 330, 331, 332 beacon or identification information; and metrics for interference derived from the channel state feedback. In the interference graph 300, UE 331 is in an overlapping coverage area between the first coverage area 304 and the second coverage area 308 in a frequency range. Because the UE 331 is being supplied signals from the first RU 302 and second RU 306 in the same frequency range, the interference graph may indicate that there is interference caused by the simultaneous provision of frequency signals in the same frequency range from both the first RU 302 and the second RU 306. Any of a DU, CU, cloud server, or other controller may decide to modify transmission power from one or more of the first RU 302 and second RU 306 to limit the interference experienced by UE 331. Reducing transmission power from the first RU 302 may be problematic, as it will likely cause issues with UE 332, which is just on the border of the first coverage area 304. The centralized control may prefer to reduce transmission power from the second RU 306 such that the UE 331 is no longer in the second coverage area 308 but UE 330 remains in the coverage area. Reducing transmission power from the second RU 306 may reduce the second coverage area 308 to allow UE 331 to only be serviced by the first RU 302. This may limit the interference, and an updated interference graph may show better signal strength and/or lower interference for UE 331.

Figure 4:
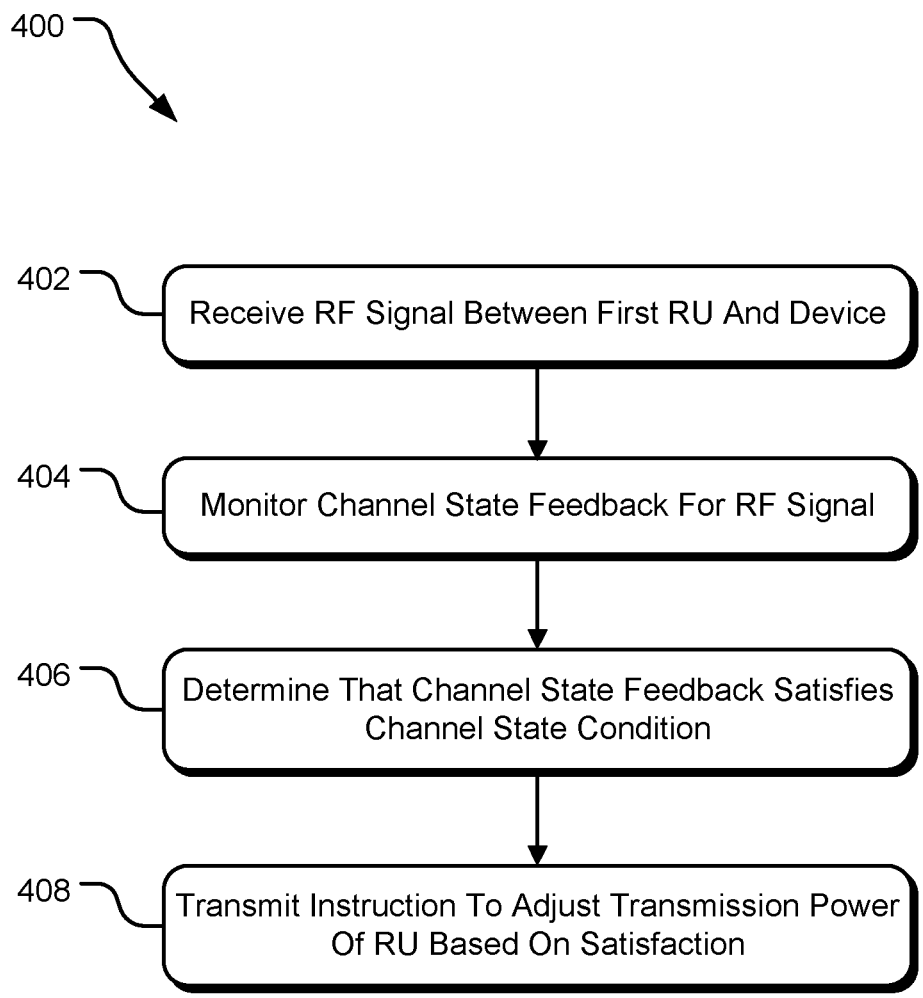
FIG. 4 illustrates example operations of controlling transmission power from at least one RU.

FIG. 4 illustrates example operations 400 of controlling transmission power from at least one RU. Receiving operation 402 receives a radiofrequency signal between a first RU and at least one UE (e.g., a user device) in a transmitted frequency range. The radiofrequency signal may be transmitted over a communicative coupling between the first RU and the at least one UE. When multiple RUs transmit radiofrequency communications in the same radiofrequency range with a single UE, it may cause interference with a signal or reduced signal strength of the UE.

Monitoring operation 404 dynamically monitors channel state feedback for the received radiofrequency signal in the transmitted frequency range. In order to determine the interference and/or signal strength experienced by the at least one UE, channel state feedback may be generated at a centralized or distributed controller for each connection between UEs and RUs. Channel state feedback may include data from UEs and RUs that indicate interference by, for example, one or more of the distance between UEs and RUs; the number of RUs to which particular UEs of the at least one UE are communicatively coupled in a particular frequency range; geographic considerations; the number of UEs communicatively coupled to the RU in the frequency range; error rates in data transfer between the UEs and RUs (e.g., bits or packets dropped); current levels of transmission power from the RUs; measured signal strength; measured data throughput; and expected data throughput (e.g., for comparison). Also, if a UE receives strong signals from more than one RU in a particular frequency range, it is an indication that there is interference. In implementations, error rates can be determined through reception of data from UEs without dedicated channel state feedback inquiries or can be determined by actively transmitting dedicated channel state feedback inquiries from the RUs to the user equipment and receiving the replies. Base stations may transmit reference signals and measure the channel state feedback. For example, in multiple-input-multiple-output (MIMO) systems, the base station may transmit a reference signal to the at least one UE. From this reference signal, the at least one UE may calibrate channel state feedback, perhaps with information including how the environment modifies the signal transmitter in each of the transmission frequencies. The reference signal may come in the form of system information blocks and master information blocks. This information may include beacon information including, for example, bandwidth, UE identifier, and network identifier. The base stations may rely on beacon information to identify the at least one UE.

The channel state feedback may be expressed in an interference graph. The interference graph may be generated by the centralized controller. The interference graph may represent a metric of signal quality. An interference graph may express one or more of a magnitude of interference and a strength of communications in a transmission frequency range experienced in data exchanges between the at least one UE and communicatively coupled RUs. The interference graph may provide a more global view of RUs that transmit in the same or similar frequency range and are sufficiently proximal to one another to potentially cause interference in communications with the at least one UE.

Determining operation 406 determines that the channel state feedback satisfies a channel state condition. Determining operation 406 may use a centralized controller to determine whether the channel state feedback satisfies a channel state condition. The channel state condition may reflect one or more of a UE signal strength, UE signal interference, and UE signal coverage. The satisfaction of a channel state condition may be determined using channel state feedback from multiple UEs including the at least one UE and multiple RUs including the first RU, perhaps aggregated in an interference graph. For example, channel state feedback can include feedback from connections between UEs and RUs to determine whether a condition is satisfied. The condition may be based at least in part on an overall impression of coverage and connectivity in partially overlapping coverage areas to determine whether transmission power adjustments to one or more of RUs may provide better service to one or more of the UEs. The channel state condition may also include measures to prevent changing transmission power to RUs which may cause one or more UEs to have limited or no coverage from the RUs.

The centralized controller may use inferential methods to determine the overall impression of channel state feedback generated between one or more RUs and UEs and whether the channel state feedback satisfies the channel state condition. The inferential methods may include, for example, one or more of machine learning, artificial intelligence, state machines, propagation modeling, and regression modeling. In implementations, the centralized controller may be positioned in a distributed unit, a centralized unit, or a cloud unit, or may be distributed among them. Machine learning algorithms applied may include one or more of supervised learning, long-short-term memory, reinforcement learning, and combinatorial optimization. The data input may include one or more of current transmission power of the RUs; channel state feedback generated; reference signals transmitted; environmental factors; numbers of UEs; locations of RUs; UE triangulation data; transmission frequency data for one or more of the UEs and RUs; beacon information; and data representing to which RUs the EUs are communicatively coupled and/or communicatively couplable, perhaps with specificity in the frequency ranges in which the UEs operate.

The centralized controller may include a radio access network (RAN) controller, for example, a radio access network intelligent controller (RIC). In modern RIC systems, the RIC may include one or more of a non-real-time RIC (supporting tasks allowing greater than one second of latency) and near-real-time RICs (supporting tasks benefitting from latency of a second or less). Overall RAN (O-RAN) architecture may include one or more software elements, for example, a distributed unit (DU) software function, a multi-radio access transmission (multi-RAT) central unit (CU) protocol stack, a Near-RT RIC, and the orchestration layer with Non-RT RIC.

Transmitting operation 408 transmits an instruction to adjust a transmission power in the transmitted frequency range of the at least one RU based at least in part on the satisfaction of the channel state condition. The centralized controller may be responsible for transmitting the transmission adjustment instruction and may do so responsively to the channel state feedback, the channel state feedback perhaps expressed in the interference graph.

In other systems in which control of transmission power supplied to RUs is decentralized, perhaps due to the use of local, specialized hardware, the RUs may only have the ability to control transmission power based at least in part on the issues experienced locally at each RU. When the control is centralized, even if the communications between UEs and the first RU are satisfactory, the centralized controller may transmit instructions to adjust transmission power supplied to the first RU because it would improve performance of UE connections with a different RU. In systems where the control is localized at the RUs or other transmitters, there may be insufficient centralized control to allow for changes in transmission power supplied to the first RU that are based at least in part on the communications of a different, second RU that is near or adjacent to the first RU and transmits in the same radiofrequency range. This may provide an advantage over locally controlled RU systems in which local transmission power adjustment at the first RU does not account for communications with the different RU.

The most static control of coverage area for an RU is the location of the RU itself. This may not be readily modifiable without significant planning. The centralized control can rely on varying levels of dynamic control after the RUs have already been placed. In an implementation, the distance of centralized controllers of transmission power from the controlled RUs may depend on different levels of dynamicity needed. For example, for largely static systems, latency is not a significant issue, and control can be established at centralized systems more distant from the RUs. Some sources of interference may be environmental (e.g., large concrete or steel structures that interfere with signals) such that they do not significantly or quickly change with time, so control for these changes may be a bit further from the RUs. Systems or locations in which users are expected to transfer between RUs frequently (e.g., on a highway) may have less latency tolerance for dynamic transmission power and transitioning connectivity between RUs and UEs and may require control closer to the RUs for these scenarios. The frequency or number of instructions transmitted over time for adjusting power at RUs over time (not to be confused with the radio frequency at which the instructions are transmitted) may differ depending on the dynamicity required. The responsibilities of the centralized controller expressed herein may be distributed between one or more of DUs, CUs, cloud servers, and RICs (however distributed among those or other network devices).

Operations for control at different levels of dynamicity are contemplated. For example, the instructions to adjust power dynamically may be in response to data throughput determinations between RUs and UEs. An interference graph may be used for this determination. Periodic adjustments to transmission power may be made based at least in part on changes to the environment that may be less frequent. Implementations are contemplated where the transmission power adjustments may be real-time or near-real-time and/or consistent.

Figure 5:
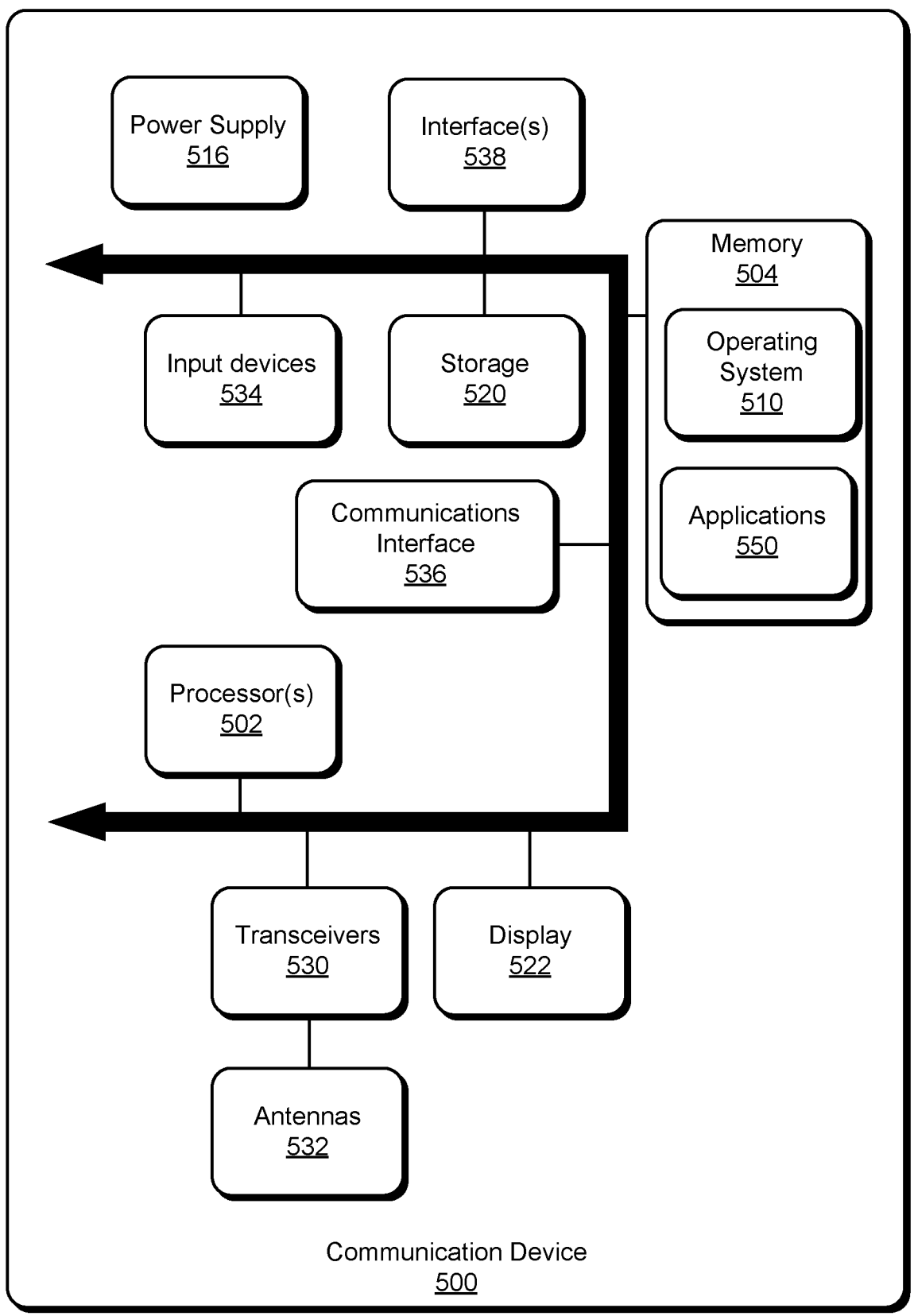
FIG. 5 illustrates an example computing device for implementing the features and operations of the described technology.

FIG. 5 illustrates an example computing device 500 for implementing the features and operations of the described technology. The computing device 500 may embody a remote-control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 500 includes one or more processor(s) 502 and a memory 504. The memory 504 generally includes both volatile memory (e.g., RAM) and nonvolatile memory (e.g., flash memory). An operating system 510 resides in the memory 504 and is executed by the processor(s) 502. One or more of DUs, CUs, UEs, user devices, RUs, and cloud servers may be implementations of the computing device 500.

In an example computing device 500, as shown in FIG. 5, one or more modules or segments, such as applications 550, CUs, DUs, cloud server services, inference engines, inferential methods, machine learning algorithms, long-term short-term memory algorithms, supervised learning programs, artificial intelligence programs, reinforcement learning algorithms, propagation modeling algorithms, recurrent neural networks, regression model algorithms, RICs, near-real-time RICs, non-real-time RICs, O-RANs, multi-RATs, L1 layers, lower L2 layers, higher L2 layers, L3 layers, datalink layers, scheduling functions, RRHs, 5G modules, physical layers, radio link control sublayers, medium access control sublayers, eNBs, gNBs, user data transfer modules, mobility control modules, RAN sharing modules, positioning modules, session management modules, monitors, mid-haul interfaces, virtual software functions, and standard RAN tiered data center modules are loaded into the operating system 510 on the memory 504 and/or storage 520 and executed by processor(s) 502. The storage 520 may include one or more tangible storage media devices and may store channel state feedback, data representing distance between UEs and RUs, data representing the number of RUs to which a particular UE is communicatively coupled in a particular frequency range, data representing geographic considerations, data representing the number of UEs communicatively coupled to a RU in the frequency range, data representing error rates in data transfer between UEs and RUs (e.g., bits or packets dropped), data representing current levels of transmission power from the RUs, data representing a measured signal strength, data representing measured data throughput, data representing expected data throughput, data representing RU locations, data representing a channel state condition, transmission power instructions, reference signal data, beacon information, system information blocks, master information blocks, bandwidth data, UE identifier data, network identifier data, frequency range data, coverage area data, aggregated interference data, power adjustment data, data representing current transmission power of the RUs, data representing numbers of UEs, replies, UE triangulation or location data, data representing to which RUs the EUs are communicatively coupled and/or communicatively couplable, perhaps with specificity in the frequency ranges in which the UEs operate.

Locally and globally unique identifiers, requests, responses, and other data and be local to the computing device 500 or may be remote and communicatively connected to the computing device 500.

The computing device 500 includes a power supply 516, which is powered by one or more batteries or other power sources and which provides power to other components of the computing device 500. The power supply 516 may also be connected to an external power source that overrides or recharges the built-in batteries or other power sources.

The computing device 500 may include one or more communication transceivers 530, which may be connected to one or more antenna(s) 532 to provide network connectivity (e.g., mobile phone network, Wi-Fi®, Bluetooth®) to one or more other servers and/or client devices (e.g., mobile devices, desktop computers, or laptop computers). The computing device 500 may further include a network adapter 536, which is a type of computing device. The computing device 500 may use the adapter and any other types of computing devices for establishing connections over a wide-area network (WAN) or local-area network (LAN). It should be appreciated that the network connections shown are examples and that other computing devices and means for establishing a communications link between the computing device 500 and other devices may be used.

The computing device 500 may include one or more input devices 534 such that a user may enter commands and information (e.g., a keyboard or mouse). These and other input devices may be coupled to the server by one or more interfaces 538, such as a serial port interface, parallel port, or universal serial bus (USB). The computing device 500 may further include a display 522, such as a touch screen display.

The computing device 500 may include a variety of tangible processor-readable storage media and intangible processor-readable communication signals. Tangible processor-readable storage can be embodied by any available media that can be accessed by the computing device 500 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/AS SPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

An example method for controlling transmission power from one or more radio units is provided. The method includes dynamically monitoring channel state feedback for a radiofrequency signal communicated between a first radio unit of the one or more radio units and at least one user device in a transmitted frequency range, wherein the channel state feedback is based at least in part on a metric of quality of the communicated radiofrequency signal, determining that the channel state feedback satisfies a channel state condition, wherein the channel state condition includes a metric to evaluate performance of the one or more radio units relative to the at least one user device based at least in part on the metric of quality of the communicated radiofrequency signal, and transmitting an instruction to adjust a transmission power in the transmitted frequency range of at least one of the one or more radio units based at least in part on the satisfaction of the channel state condition.

Another example method of any preceding method is provided, wherein the operation of dynamically monitoring channel state feedback includes generating an interference graph representing strength of communications between each of the one or more radio units and each of the at least one user device with which the one or more radio units is in communication.

Another example method of any preceding method is provided, wherein the channel state condition includes that the at least one user device experiences interference from communicating with both the first radio unit and a second radio unit of the at least one of the one or more radio units in the transmitted frequency range.

Another example method of any preceding method is provided, wherein the channel state condition includes that more user devices of the at least one user device are communicating with a first radio unit than a second radio unit of that at least one of the one or more radio units.

Another example method of any preceding method is provided, wherein the operation of dynamically monitoring channel state feedback includes determining interference in a communication between the at least one user device and each of one or more radio units with which the at least one user device communicates based at least in part on one or more of measuring a strength of signal in the communication, measuring a data throughput through the at least one user device for the communication, determining that more than one of one or more radio units are provided sufficient transmission power to provide service to a same user device of the at least one user device, and detecting an error in the communication.

Another example method of any preceding method is provided, wherein the operation of transmitting an instruction includes transmitting the instruction to a different radio unit from the first radio unit.

Another example method of any preceding method is provided, the method further including modifying a frequency at which the instruction is transmitted based at least in part on the channel state feedback.

An example computing device is provided. The computing device includes a processor and a memory, the processor configured to execute operations stored in the memory. The computing device further includes a monitor executable by the processor to monitor channel state feedback for a radiofrequency signal communicated between a first radio unit of one or more radio units and at least one user device in a transmitted frequency range, wherein the channel state feedback is based at least in part on a metric of quality of the communicated radiofrequency signal, a determiner executable by the processor to determine that the channel state feedback satisfies a channel state condition, and a transmitter to transmit an instruction to adjust a transmission power in the transmitted frequency range of at least one of the one or more radio units based at least in part on the satisfaction of the channel state condition.

Another example computing device of any preceding device is provided, wherein the monitor monitors channel state feedback by generating an interference graph representing strength of communications between each of one or more radio units and each of the at least one user device with which the at least one of the one or more radio units is in communication.

Another example computing device of any preceding device is provided, wherein the channel state condition includes that at least one user device experiences interference from communicating with both the first radio unit and a second radio unit of the at least of the one or more radio units in the transmitted frequency range.

Another example computing device of any preceding device is provided, wherein the channel state condition includes that more user devices of the at least one user device are communicating with a first radio unit than a second radio unit of the at least one of the one or more radio units.

Another example computing device of any preceding device is provided, wherein the monitor is operable to monitor channel state feedback by at least determining interference in a communication between the at least one user device and each of the one or more radio units with which the at least one user device communicates based at least in part on one or more of a measured strength of signal in the communication, a measured data throughput through the at least one user device for the communication, a determination that more than one of one or more radio units are provided sufficient transmission power to provide service to a same user device of the at least one user device, and a detection of an error in the communication.

Another example computing device of any preceding device is provided, wherein the transmitter transmits the instruction to a different radio unit from the first radio unit.

Another example computing device of any preceding device is provided, the computing device further including a frequency modifier operable to modify a frequency at which the instruction is transmitted based at least in part on the channel state feedback.

One or more example tangible processor-readable storage media embodied with instructions for executing on one or more processors and circuits of a communication device a process for controlling transmission power in one or more radio units is provided. The process includes monitoring channel state feedback for a radiofrequency signal communicated between a first radio unit of the one or more radio units and at least one user device in a transmitted frequency range, wherein the channel state feedback is based at least in part on a metric of quality of the communicated radiofrequency signal, determining that the channel state feedback satisfies a channel state condition, and transmitting an instruction to adjust a transmission power in the transmitted frequency range of at least one of the one or more radio units based at least in part on the satisfaction of the channel state condition.

One or more other example tangible processor-readable storage media of any preceding media is provided, wherein the operation of monitoring channel state feedback includes generating an interference graph representing strength of communications between each of the one or more radio units and each of the at least one user device with which the one or more radio units is in communication.

One or more other example tangible processor-readable storage media of any preceding media is provided, wherein the channel state condition is that the at least one user device experiences interference from communicating with both the first radio unit and a second radio unit of the one or more radio units in the transmitted frequency range.

One or more other example tangible processor-readable storage media of any preceding media is provided, wherein the channel state condition is that more user devices of the at least one user device are communicating with a first radio unit than a second radio unit of the one or more radio units.

One or more other example tangible processor-readable storage media of any preceding media is provided, wherein the operation of monitoring channel state feedback includes determining interference in a communication between the at least one user device and each of the one or more radio units with which the at least one user device communicates based at least in part on one or more of measuring a strength of signal in the communication, measuring a data throughput through the at least one user device for the communication, determining that more than one of one or more radio units are provided sufficient transmission power to provide service to a same user device of the at least one user device, and detecting an error in the communication.

One or more other example tangible processor-readable storage media of any preceding media is provided, wherein the operation of transmitting an instruction includes transmitting the instruction to a different radio unit from the first radio unit.

An example system for controlling transmission power from one or more radio units is provided. The system includes means for dynamically monitoring channel state feedback for a radiofrequency signal communicated between a first radio unit of the one or more radio units and at least one user device in a transmitted frequency range, wherein the channel state feedback is based at least in part on a metric of quality of the communicated radiofrequency signal, means for determining that the channel state feedback satisfies a channel state condition, wherein the channel state condition includes a metric to evaluate performance of the one or more radio units relative to the at least one user device based at least in part on the metric of quality of the communicated radiofrequency signal, and means for transmitting an instruction to adjust a transmission power in the transmitted frequency range of at least one of the one or more radio units based at least in part on the satisfaction of the channel state condition.

Another example system of any preceding system is provided, wherein the dynamic monitoring of channel state feedback includes generation of an interference graph representing strength of communications between each of the one or more radio units and each of the at least one user device with which the one or more radio units is in communication.

Another example system of any preceding system is provided, wherein the channel state condition includes that the at least one user device experiences interference from communicating with both the first radio unit and a second radio unit of the at least one of the one or more radio units in the transmitted frequency range.

Another example system of any preceding system is provided, wherein the channel state condition includes that more user devices of the at least one user device are communicating with a first radio unit than a second radio unit of that at least one of the one or more radio units.

Another example system of any preceding system is provided, wherein the dynamic monitoring of channel state feedback includes a determination of interference in a communication between the at least one user device and each of one or more radio units with which the at least one user device communicates based at least in part on one or more of a measured strength of signal in the communication, a measured data throughput through the at least one user device for the communication, a determination that more than one of one or more radio units are provided sufficient transmission power to provide service to a same user device of the at least one user device, and a detection of an error in the communication.

Another example system of any preceding system is provided, wherein the transmission of the instruction includes transmitting the instruction to a different radio unit from the first radio unit.

Another example system of any preceding system is provided, the system further including means for modifying a frequency at which the instruction is transmitted based at least in part on the channel state feedback.

While this specification contains many specific implementation details, these should not be construed as limitations on the scope of any inventions or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method for controlling transmission power from radio units, the method comprising:
   dynamically monitoring channel state feedback for a radiofrequency signal communicated between a first radio unit of the radio units and each of user devices in a transmitted frequency range, wherein the channel state feedback is based at least in part on a metric of quality of the communicated radiofrequency signal;
   generating an interference graph representing strength of communications between each of the radio units and each of the user devices with which the radio units are in communication based at least in part on the channel state feedback;
   determining that the interference graph satisfies a channel state condition, wherein the channel state condition includes a metric to evaluate performance of the radio units relative to the user devices based at least in part on the metric of quality of the communicated radiofrequency signal; and
   transmitting an instruction to adjust a transmission power in the transmitted frequency range of at least one of the radio units based at least in part on the satisfaction of the channel state condition.

2. The method of claim 1, wherein the channel state condition includes that at least one of the user devices experiences interference from communicating with both a first radio unit and a second radio unit of the at least one of the radio units in the transmitted frequency range.

3. The method of claim 1, wherein the channel state condition includes that more of the user devices are communicating with a first radio unit than a second radio unit of the radio units.

4. The method of claim 1, wherein the operation of dynamically monitoring channel state feedback includes determining interference in a communication between a first user device of the user devices and each of the radio units with which first user device communicate based at least in part on one or more of:
   measuring a strength of signal in the communication;
   measuring a data throughput through the first user device for the communication;
   determining that the radio units are provided sufficient transmission power to provide service to the first user device; and
   detecting an error in the communication.

5. The method of claim 1, wherein the operation of transmitting an instruction comprises:
   transmitting the instruction to a different radio unit from the first radio unit.

6. The method of claim 1, further comprising:
   modifying a frequency at which the instruction is transmitted based at least in part on the channel state feedback.

7. The method of claim 1, wherein the interference graph includes a coverage area of the first radio unit.

8. The method of claim 1, wherein the interference graph indicates an overlapping coverage area provided by the first radio unit and a second radio unit of the radio units, wherein the satisfaction of the channel state condition is based at least in part on the overlapping coverage area.

9. A computing device having a processor and a memory, the processor configured to execute operations stored in the memory, the computing device comprising:
   a monitor executable by the processor to monitor channel state feedback for a radiofrequency signal communicated between a first radio unit of one or more radio units and at least one user device in a transmitted frequency range, wherein the channel state feedback is based at least in part on a metric of quality of the communicated radiofrequency signal;
   a determiner executable by the processor to determine that the channel state feedback satisfies a channel state condition, wherein the channel state condition includes that more user devices of the at least one user device are communicating with a first radio unit than a second radio unit of the one or more radio units; and
   a transmitter to transmit an instruction to adjust a transmission power in the transmitted frequency range of at least one of the one or more radio units based at least in part on the satisfaction of the channel state condition.

10. The computing device of claim 9, wherein the monitor monitors channel state feedback by generating an interference graph representing strength of communications between each of one or more radio units and each of the at least one user device with which the at least one of the one or more radio units is in communication.

11. The computing device of claim 9, wherein the channel state condition includes that at least one user device experiences interference from communicating with both the first radio unit and a second radio unit of the at least of the one or more radio units in the transmitted frequency range.

12. The computing device of claim 9, wherein the monitor is operable to monitor channel state feedback by at least determining interference in a communication between the user device and each of the one or more radio units with which the user device communicates based at least in part on one or more of:
- a measured strength of signal in the communication;
- a measured data throughput through the user device for the communication;
- a determination that more than one of one or more radio units are provided sufficient transmission power to provide service to a same user device of the user device; and
- a detection of an error in the communication.

13. The computing device of claim 9, wherein the transmitter transmits the instruction to a different radio unit from the first radio unit.

14. The computing device of claim 9, further comprising:
- a frequency modifier operable to modify a frequency at which the instruction is transmitted based at least in part on the channel state feedback.

15. One or more tangible processor-readable storage media embodied with instructions for executing on one or more processors and circuits of a communication device a process for controlling transmission power in one or more radio units, the process comprising:
- monitoring channel state feedback for a radiofrequency signal communicated between a first radio unit of the one or more radio units and user device in a transmitted frequency range, wherein the channel state feedback is based at least in part on a metric of quality of the communicated radiofrequency signal;
- determining that the channel state feedback satisfies a channel state condition; and
- transmitting an instruction to adjust a transmission power in the transmitted frequency range of at least one of the one or more radio units based at least in part on the satisfaction of the channel state condition to modify the number of user devices of the user device to which the first radio unit provides service.

16. The one or more tangible processor-readable storage media of claim 15, wherein the operation of monitoring channel state feedback includes generating an interference graph representing strength of communications between each of the one or more radio units and each of the user device with which the one or more radio units is in communication.

17. The one or more tangible processor-readable storage media of claim 15, wherein the channel state condition is that the user device experiences interference from communicating with both the first radio unit and a second radio unit of the radio units in the transmitted frequency range.

18. The one or more tangible processor-readable storage media of claim 15, wherein the channel state condition is that more user devices of the user device are communicating with a first radio unit than a second radio unit of the one or more radio units.

19. The one or more tangible processor-readable storage media of claim 15, wherein the operation of monitoring channel state feedback includes determining interference in a communication between the user device and each of the one or more radio units with which the user device communicates based at least in part on one or more of:
- measuring a strength of signal in the communication;
- measuring a data throughput through the user device for the communication;
- determining that more than one of one or more radio units are provided sufficient transmission power to provide service to a same user device of the user device; and
- detecting an error in the communication.

20. The one or more tangible processor-readable storage media of claim 15, wherein the operation of transmitting an instruction comprises:
- transmitting the instruction to a different radio unit from the first radio unit.

* * * * *